April 8, 1947. G. F. DRAKE 2,418,466
FRICTION CLUTCH
Filed Feb. 28, 1944

INVENTOR
George Forrest Drake
By Carlson, Pitzner, Hubbard & Wolfe
ATTORNEYS

Patented Apr. 8, 1947

2,418,466

UNITED STATES PATENT OFFICE 2,418,466

FRICTION CLUTCH

George Forrest Drake, Rockford, Ill., assignor to Woodward Governor Company, Rockford, Ill., a corporation of Illinois Application February 28, 1944, Serial No. 524,200

4 Claims. (Cl. 192—84)

One object of this invention is to provide a novel friction clutch whose torque transmitting capacity is substantially unaffected by lubrication of its gripping surfaces.

A more detailed object is to provide a friction clutch in which the coacting gripping elements are so constructed and pressed together as to break down any lubricant film on the coacting surfaces and cause the surfaces to grip each other with a friction coefficient approximating that of the surfaces when dry.

Another object is to provide a novelly arranged electromagnetic actuator for causing gripping engagement of the clutch elements.

Other objects and advantages of the invention will become apparent from the following detailed description taken in connection with the accompanying drawings, in which Figure 1 is a diametrical sectional view of the improved clutch and associated gearing.

Figure 1:
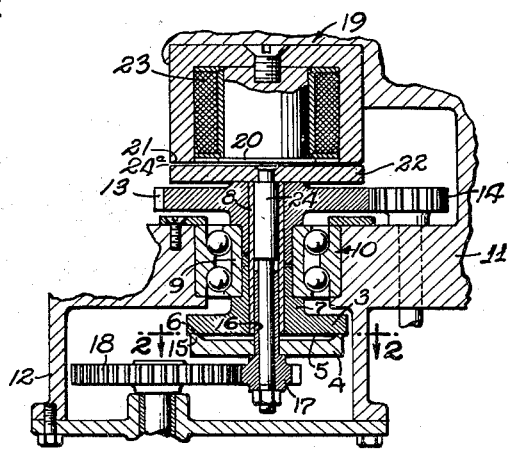
Figure 2:
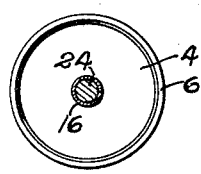
Fig. 2 is a face view of one of the clutch elements taken along the line 2—2 of Fig. 1.
Figure 3:
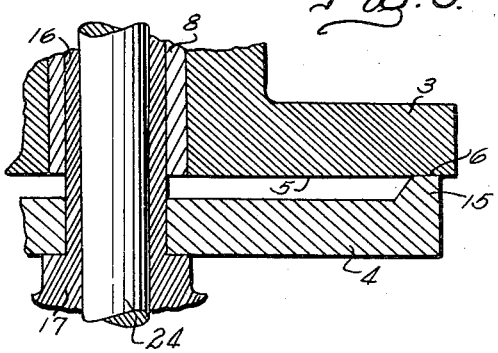
Fig. 3 is an enlarged fragmentary section of a portion of Fig. 1.

The clutch shown for purposes of illustration comprises two rotary elements in the form of disks 3 and 4 presenting smooth and continuous gripping surfaces 5 and 6 composed of non-porous material which is incapable of absorbing ordinary lubricants. While resins, various metals, and other non-absorbent materials may be used, the surfaces are formed of hardened steel in the present instance in order to possess high resistance to wear. The surface 5 is the flat end face of the disk 3 whose hub 7 is pressed onto a bushing 8 and into the inner race 9 of an anti-friction thrust bearing 10 which is supported in a cross member 11 of a casing 12 which houses the clutch and associated gearing. A gear 13 also fast on the bushing 8 is driven from a pinion 14, the two gears being lubricated by oil or grease contained within the casing.

The face 6 is flat and formed on the end of an annular rib 15 projecting axially from the disk 4 toward the disk 3. This rib is of narrow radial width and of substantially the full diameter of the disk so as to provide a moment arm of maximum radius and yet possess a comparatively small total area. Herein the disk 4 is fast on a bushing 16 carrying a pinion 17 which meshes with a gear 18 to form another step in the lubricated speed reduction gearing.

Herein, selective engagement and disengagement of the clutch are controlled by an electromagnet 19 stationarily mounted in the casing 12 and having concentric axially facing poles 20 and 21 which attract an armature disk 22 upon energization of a winding 23. The armature is fast on a shaft 24 journaled in the bushing 8 and projecting through the bushing 16 and the pinion 17. At its lower end, the shaft carries a nut which limits the motion of the armature toward the magnet poles so as to leave a narrow air gap 24$^a$ of a few thousandths of an inch and prevent actual contact between the armature and magnet when the latter is energized. By employing clutch surfaces of rigid material such as hardened steel, the gap is maintained through long periods of service use and wear on the magnetic parts is avoided. The mass of the rotating parts is minimized by mounting the magnet stationarily.

When the magnet is deenergized, oil or grease contained within the casing 12 to provide lubricant for the gearing and associated parts will work onto and between the gripping surfaces 5 and 6, but will not be absorbed by the latter owing to their smooth and non-porous character. Therefore, when the surfaces are drawn together under the force of the magnet, the lubricant will be squeezed out from between the surfaces, and the film which tends to remain on these surfaces will be broken down if the unit pressure is sufficiently high and is correlated with the shape and other characteristics of the gripping surfaces and the character of the lubricant employed. For example, if, in the arrangement above described, the rib 15 is made $1\frac{7}{16}$ inches in diameter with a face substantially $\frac{1}{16}$ of an inch wide, ordinary lubricants will be excluded from the gripping area effectively under a total magnet force of 50 pounds, this being 230 pounds per square inch over the area 6. It has been found that the clutch thus constructed will exert, without slipping, a torque of 5 pound inches as compared to a torque of $5\frac{5}{16}$ pound inches when the clutch is engaged with the surfaces dry. Thus, the film of oil existing between the coacting gripping faces 5 and 6 is broken down and squeezed out of the narrow gripping area so completely that the surface possess an effective coefficient of friction very closely approximating that of the surfaces when the latter are dry or unlubricated. Relative motion between the clutch parts assists in breaking down the oil film and facilitates the attainment of optimum torque transmitting capacity.

I claim as my invention:

1. A friction clutch adapted to operate in a lubricant comprising, a rotary driving element, a rotary driven element supported for axial movement relative thereto, said elements having axially engageable annular surfaces near the periphery thereof of narrow radial width and composed of hardened steel, each of said surfaces being smooth and circumferentially continuous, and means by which said elements may be urged into gripping engagement under a unit pressure on said surfaces of sufficient magnitude to squeeze out said lubricant so completely that the coefficient of friction between the surfaces is increased to a value approximating that of the surfaces when the latter are dry, the narrow width of said annular surfaces enabling rapid ejection of the lubricant therefrom upon actuation of said urging means.

2. A friction clutch comprising, a rotary driving element, a rotary driven element supported for relative axial movement with respect thereto and having coacting annular surfaces near the periphery thereof adapted for axial gripping engagement over an area of narrow radial width, said surfaces being smooth, circumferentially continuous, and incapable of absorbing lubricant, and selectively controllable means for urging said elements into gripping engagement under a force correlated with the size, shape, and physical characteristics of said surfaces and of sufficient magnitude to squeeze lubricant out of said area so completely that the coefficient of friction between said surfaces is increased to a value substantially equal to that of the surfaces when the latter are dry, the narrow width of said annular surfaces enabling rapid ejection of the lubricant therefrom upon actuation of said urging means.

3. A friction clutch for transmitting power even when bathed in lubricant comprising a rotary driving element, a rotary driven element coaxially mounted with respect thereto, said elements having annular coacting surfaces near the periphery thereof which are smooth and continuous and incapable of absorbing said lubricant, and selectively controllable means for urging said elements into gripping engagement under a force correlated with the size, shape, and characteristics of said surfaces and of sufficient magnitude to break down substantially completely the lubricant film tending to separate the surfaces, said coacting surfaces being sufficiently narrow in radial width as to enable rapid and positive ejection of said lubricant upon actuation of said urging means.

4. A friction clutch for transmitting torque in the presence of a lubricant comprising a rotary driving element, a rotary driven element, said elements being arranged coaxially and presenting unbroken annular coacting surfaces near the outer periphery thereof adapted for gripping engagement and incapable of absorbing lubricant to which the surfaces may be exposed, and selectively controllable means for applying a unit pressure on said coacting surfaces in excess of the film strength of ordinary oil lubricants to force said elements into gripping engagement, said coacting annular surfaces being of a sufficiently narrow width as not only to promote the development of said excessive unit pressure but also to enable rapid ejection of oil therefrom under conditions of rapidly repetitive clutching.

GEORGE FORREST DRAKE.

REFERENCES CITED

The following references are of record in the file of this patent:

UNITED STATES PATENTS

| Number | Name | Date |
|---|---|---|
| 1,866,128 | Pfeiffer | July 5, 1932 |
| 1,610,141 | Michael | Dec. 7, 1926 |
| 1,500,971 | Wallace | July 8, 1924 |
| 1,963,638 | Wilsing | June 19, 1934 |
| 1,189,176 | Price | June 27, 1916 |
| 987,954 | Brush | Mar. 28, 1911 |

FOREIGN PATENTS

| Number | Country | Date |
|---|---|---|
| 319,852 | British | Oct. 3, 1929 |